US008537143B2

(12) United States Patent
Lu et al.

(10) Patent No.: US 8,537,143 B2
(45) Date of Patent: Sep. 17, 2013

(54) TOUCH-CONTROLLED SYSTEM AND METHOD

(75) Inventors: Jun-Liang Lu, New Taipei (TW); Hsin-Yu Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 183 days.

(21) Appl. No.: 13/115,993

(22) Filed: May 26, 2011

(65) Prior Publication Data

US 2012/0044168 A1 Feb. 23, 2012

(30) Foreign Application Priority Data

Aug. 17, 2010 (TW) .............................. 99127461 A

(51) Int. Cl.
*G06F 3/033* (2013.01)
(52) U.S. Cl.
USPC ........................... 345/179; 345/156; 345/173
(58) Field of Classification Search
None
See application file for complete search history.

(56) References Cited

U.S. PATENT DOCUMENTS

| 2003/0197691 A1* | 10/2003 | Fujiwara et al. ............. 345/179 |
| 2007/0041654 A1* | 2/2007 | Wang et al. .................. 382/260 |
| 2007/0139300 A1 | 6/2007 | Salters et al. |
| 2008/0095440 A1* | 4/2008 | Onishi et al. ................. 382/181 |
| 2010/0164912 A1* | 7/2010 | Soga et al. .................... 345/204 |
| 2012/0162145 A1* | 6/2012 | Knee et al. ................... 345/179 |

FOREIGN PATENT DOCUMENTS

| TW | 201001238 | 1/2010 |
| WO | 2009123106 | 10/2009 |

OTHER PUBLICATIONS

"Office Action of Taiwan Counterpart Application", issued on Jun. 28, 2013, p1-p7, in which the listed references were cited.

* cited by examiner

*Primary Examiner* — Lixi C Simpson
(74) *Attorney, Agent, or Firm* — Jianq Chyun IP Office

(57) ABSTRACT

A touch-controlled system and a touch-controlled method are provided. The touch-controlled system includes a screen, a host, and an electronic pen. The screen is used to display an image with hidden coding. The host is used to drive the screen for displaying. When the electronic touches the screen, the electronic pen captures a part of the image of the screen and sends captured image to the host. At least one hidden information in the captured image. The host analyzes and decodes the hidden information, to get a cursor position where the electronic pen touches, and the cursor position is displayed on the screen.

22 Claims, 5 Drawing Sheets

MSB                                                             LSB

Pixel 1:

0: representing x-coordinate
1: representing y-coordinate

Coding position

MSB                                                             LSB

R: | 1 | 1 | 0 | 1 | 0 | 0 | 0 | 0 |

G: | 0 | 1 | 0 | 1 | 0 | 0 | 0 | 0 |

B: | 1 | 0 | 0 | 1 | 0 | 0 | 0 | 1 |

Pixel 2:

0: representing x-coordinate
1: representing y-coordinate

Coding position

MSB                                                             LSB

TOUCH-CONTROLLED SYSTEM AND METHOD

CROSS-REFERENCE TO RELATED APPLICATION

This application claims the priority benefit of Taiwan application serial no. 99127461, filed Aug. 17, 2010. The entirety of the above-mentioned patent application is hereby incorporated by reference herein and made a part of this specification.

BACKGROUND

1. Field of the Invention

The invention relates to a touch-controlled system and a method thereof. More particularly, the invention relates to a touch-controlled system using a hidden coding technique and a method thereof.

2. Description of Related Art

In recent years, with rapid development and wide application of information technology, wireless communication and information appliances, touch panels are gradually used to replace conventional keyboards and mice to serve as input devices of operation interfaces of many information products.

The commonly used touch panels can be grouped into resistive touch panels, capacitive touch panels and electromagnetic touch panels. According to a conventional touch method, suitable sensing devices are used in a panel to sense a touch position of a user, for example, sensors are added to the panel. When a finger or another object (for example, a pen) touches the sensor of the panel, an analog signal is generated, and a controller of the panel may convert the analog signal into a digital signal for sending to a host. Then, the host transmits back the touch position and displays it on a screen by using a touch driving program.

The conventional touch technique can only be applied to touch panels having sensors, and a problem of touch position offset is generally occurred. Regarding a large-size panel, an amount of the sensing devices required by the touch panel is accordingly increased, which may aggravate a problem of sensing sensitivity and increase a manufacturing cost. Since the conventional touch technique has the above problems, a new generation of technological breakthrough is expected to enhance the evolution of the touch market or the touch products.

SUMMARY OF THE INVENTION

The invention is directed to a touch-controlled system, which may mitigate a problem of inaccurate touch position of the conventional touch technique, and implement a touch-controlled effect on any screen.

The invention is directed to a touch-controlled method, which can be applied to the aforementioned touch-controlled system to execute steps of the touch-controlled method, so as to increase accuracy of identifying a touch position.

The invention provides a touch-controlled system including a screen, a host, and an electronic pen. The screen is arranged for displaying an image with hidden coding. The host is coupled to the screen, and the electric pen is coupled to the host. The host is used to drive the screen for displaying the image. When the electronic pen touches the screen, the electronic pen captures a part of the image on the screen and sends the captured image to the host. At least one hidden information is hidden in the image captured by the electronic pen. The host is arranged for analysing and decoding the hidden information of the captured image to obtain a cursor position where the electronic pen touches, so as to display the cursor position on the screen.

The invention provides a touch-controlled method, which is adapted to a touch-controlled system for identifying a touch position of a user. The touch-controlled system includes a screen, a host and an electronic pen. The host is used to drive the screen for displaying images. The touch-controlled method includes following steps. An image with hidden coding is displayed on the screen. When the user touches the screen through the electronic pen, the electronic pen captures a part of the image on the screen, and sends the captured image to the host, wherein at least one hidden information is hidden in the image captured by the electronic pen. The host analyses and decodes the hidden information of the captured image to obtain a cursor position where the electronic pen touches, and the cursor position is displayed on the screen.

In an embodiment of the invention, the electronic pen transmits the hidden information through radio frequency, universal serial bus, blue-tooth or other transmission methods.

In an embodiment of the invention, before the host drives the screen, a coding pattern or a digital watermark is embedded to an image to be displayed; and the host analyses the coding pattern or the digital watermark of the captured image, and performs decoding according to the coding pattern or the digital watermark, so as to obtain coordinates of the cursor position.

In an embodiment of the invention, before the host drives the screen, a least significant bit (LSB) of each pixel of an image to be displayed is hidden into the hidden information; and the host analyses the LSB of each pixel of the captured image to obtain the hidden information, and performs decoding to obtain coordinates of the cursor position.

According to the touch-controlled system and the method thereof described above, the image having hidden coding can be displayed on any screen, and special sensing devices are unnecessary to be added to the panel. In the invention, an electronic pen equipped with an optical sensor receives the hidden information on the screen, and transmits the hidden information to the host through RF, USB or blue-tooth for analysing and decoding, so as to display the cursor position on the screen. The touch technique of the invention may improve accuracy of identifying a touch position, so as to mitigate a problem of inaccurate touch position of the conventional touch technique, and implement a touch-controlled effect on any screen to achieve an interactive effect.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic diagram illustrating RGB values of a certain pixel in a binary format.

FIG. 6 is a schematic diagram illustrating coding of two adjacent pixels.

DETAILED DESCRIPTION OF DISCLOSED EMBODIMENTS

In the following embodiments, when "A" device is referred to be "connected" or "coupled" to "B" device, the "A" device can be directly connected or coupled to the "B" device, or other devices probably exist there between. Comparatively, when the "A" device is referred to be "directly connected" or "directly coupled" to the "B" device, none other device exits there between.

Figure 1:
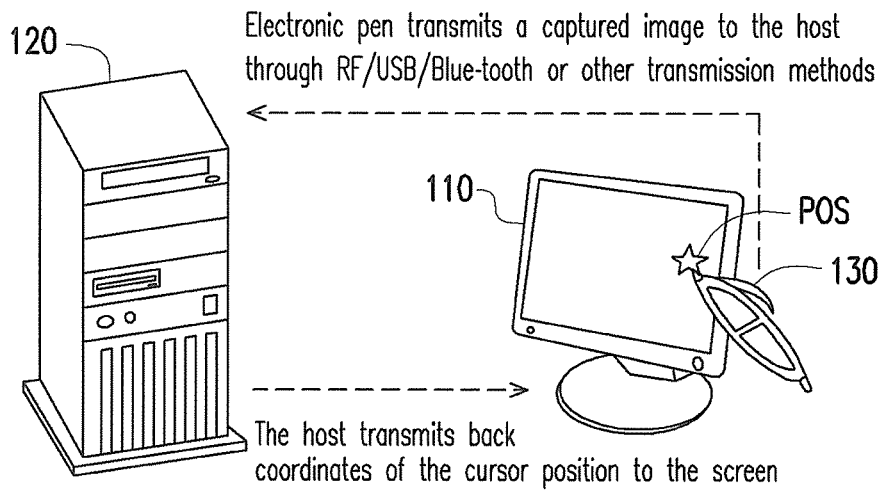
FIG. 1 is a structural diagram illustrating a touch-controlled system according to an embodiment of the invention.

Referring to FIG. 1, FIG. 1 is a structural diagram illustrating a touch-controlled system according to an embodiment of the invention. The touch-controlled system includes a screen 110, a host 120 and an electronic pen 130. The host 120 is coupled to the screen 110. The electronic pen 130 is coupled to the host 120. The host 120 is used for driving the screen 110 to display images, wherein the host 120 can be a desktop computer host or a laptop computer host, though the invention is not limited thereto. The screen 110 can be a general display that is not configured with sensing devices. The screen 110 is arranged for displaying images with hidden coding, and human eyes cannot perceive the hidden information in the image. Methods for hiding the hidden coding to the image are described in detail later. An image capturing device, a video lens, or an optical sensor can be installed at a front end of the electronic pen 130 that faces to the screen 110. When the electronic pen 130 touches a position on the screen 110, the electronic pen 130 captures a part of the displayed image, and transmits the captured image to the host 120. The host 120 analyses and decodes the hidden information of the captured image to obtain a cursor position POS where the electronic pen 130 touches, and transmits back the cursor position to the screen 110. Finally, the screen 110 displays the cursor position POS.

It should be noticed that the touch-controlled system can accurately calculate the cursor position POS where the electronic pen 130 touches the screen 110, and implement the touch-controlled on any type of the screen.

Figure 2:
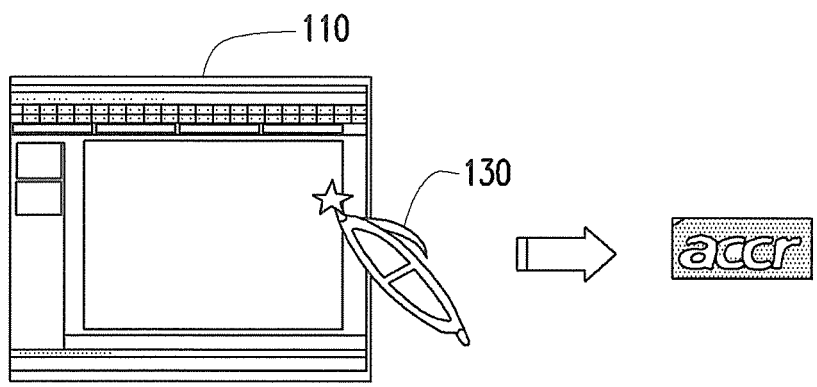
FIG. 2 is a schematic diagram illustrating a process that an electronic pen captures a screen image according to an embodiment of the invention.

Referring to FIG. 2, FIG. 2 is a schematic diagram illustrating a process that an electronic pen captures a screen image according to an embodiment of the invention. The hidden coding technique is to embed a secret message or a secret image to a cover image to produce a stego image. It should be noticed that when the screen 110 displays an image with the hidden coding, human eyes cannot perceive the hidden information in the image, and the electronic pen 130 is used to capture the image with the hidden information. The hidden information can be a specific coding pattern or a digital watermark, or other coding messages.

The electronic pen 130 can transmit the captured image to the host 120 through radio frequency (RF), universal serial bus (USB), blue-tooth or other transmission methods.

Several hidden coding and decoding methods are introduced below. The method of producing the hidden information is to perform image coding before the host drives the screen, i.e. the specific coding pattern or the digital watermark or other coding message is embedded into the image to be displayed. The decoding operation is an inverse computation or inverse transform relative to the above coding operation. When the host analyses the hidden information, the host decodes the hidden information through an inverse computation of the original coding operation to obtain coordinates of the cursor position.

First Coding Method—a Specific Coding Pattern or Digital Watermark Algorithm

A specific coding pattern or digital watermark algorithm can be performed to the image to be displayed for coding, i.e. the host can embed the specific coding pattern or the digital watermark in the image to be displayed, for example, an "accr" pattern illustrated in FIG. 2. Moreover, the image to be displayed can be first divided into a plurality of blocks, and the specific coding pattern or digital watermark algorithm can be performed to each block image. In this way, when the coded image is displayed on the screen, human eyes cannot perceive the specific coding pattern or the digital watermark in the image.

When the electronic pen touches the screen, the host can analyse the coding pattern or the digital watermark of the captured image, and perforin decoding according to the coding pattern or the digital watermark, so as to obtain coordinates of the cursor position.

Second Coding Method—Hidden Coding of Space Domain

Figure 3:
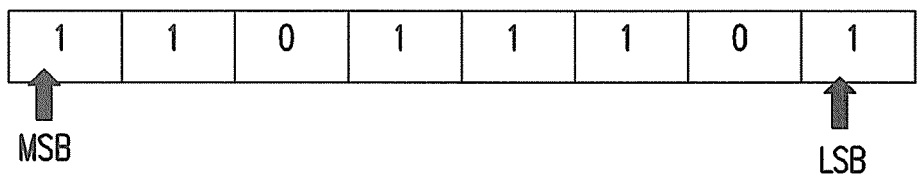
FIG. 3 is a schematic diagram illustrating hidden coding and decoding of a space domain according to an embodiment of the invention.

Referring to FIG. 3, FIG. 3 is a schematic diagram illustrating hidden coding and decoding of a space domain according to an embodiment of the invention. Generally, the image contains a plurality of pixels, and each pixel includes three sub-pixels, which are generally represented by "RGB", and each sub-pixel has 8 bits. In FIG. 3, each sub-pixel has 8 bits from a most significant bit (MSB) to a least significant bit (LSB), and human eyes are insensitive to the LSB. During the coding operation, the LSB in the 8 bits can be removed to add the hidden information. For example, information of one bit can be hidden in the sub-pixel, and during the decoding operation, the specific bit is analysed to identify a position represented by a value of such bit.

For example, the sub-pixels RGB are decimal values between 0 and 255, and are between 00000000 and 11111111 when being represented by binary values. Assuming the LSB is changed from 1 to 0, for example, the value of the sub-pixel is changed from 89 (the corresponding binary value is 01011001) to 88 (the corresponding binary value is 01011000), and the human eyes cannot perceive such tiny modification of the image.

It should be noticed that information of multiple bits can be hidden into each pixel. Since the more bits are hidden during the coding operation, the greater the image difference is, it is recommended that a value variation of a single sub-pixel does not exceed the rear four bits (or less than four bits), so as to achieve an effect that the human eyes cannot perceive the variation.

When the electronic pen touches the screen, the host can analyse the LSB of each pixel of the captured image to obtain the hidden information, and perform decoding to obtain coordinates of the cursor position.

Third Coding Method—Hidden Coding of Frequency Domain

Since the human visual system is more sensitive to a low-frequency band, and variation of the pixels is relatively small in the low-frequency band, the image is relatively smooth, fine and clear, so that if a value of the low-frequency part is slightly changed, the human eyes can easily perceive the variation. Regarding a high-frequency part, since the human visual system is hard to perceive variation of the pixels, the image is relatively rough and blur, and sensitivity of the human eyes is relatively low. The coding method of the frequency domain is to first transform an original image to a frequency domain through a specific mathematical function algorithm, and adjust a coefficient obtained after the transform to embed a specific pattern, and then restore it to the original space domain image. Main coding transform techniques are, for example, fast Fourier transform (FFT), discrete cosine transform (DCT) and discrete wavelet transform (DWT). The above mathematical transform method is only used as an example, and those skilled in the art can change the mathematical function algorithm according to an actual requirement. The decoding transform technique is to perform an inverse transform according to the used mathematical function algorithm. Therefore, when the image to be displayed is coded by a specific mathematical function algorithm, the host can embed a plurality of hidden information in the whole image. Then, when the coded image is displayed on the screen, the human eyes cannot perceive the hidden information in the displayed image.

In an embodiment, the DCT is taken as an example for description. During the coding operation, a digital gray-level image is entirely divided into space domain blocks of 8×8 pixels, and the space domain blocks are not mutually overlapped. Then, each pixel value in each space domain block subtracts 128, and is transformed according to a following equation (1):

$$D(i, j) = \frac{1}{\sqrt{2N}} C(i)C(j) \sum_{x=0}^{N-1} \sum_{y=0}^{N-1} f(x, y) \cos\left[\frac{(2x+1)i\pi}{2N}\right] \cos\left[\frac{(2y+1)j\pi}{2N}\right] \quad (1)$$

to obtain a frequency domain block having a pixel number the same to that of the space domain block. Then, a specific pattern is inserted to a high-frequency information. During the decoding operation, data of such frequency domain is transformed according to an inverse DCT (IDCT) of a following equation (2), and then each pixel value is added by 128, so as to restore the original digital image.

$$f(x, y) = \frac{1}{\sqrt{2N}} \sum_{i=0}^{N-1} \sum_{j=0}^{N-1} C(i)C(j)D(i, j) \cos\left[\frac{(2x+1)i\pi}{2N}\right] \cos\left[\frac{(2y+1)j\pi}{2N}\right] \quad (2)$$

Where, (i,j) in the equations (1) and (2) refers to a coefficient position of the frequency domain, (x,y) refers to a pixel position the space domain, f(x,y) refers to a pixel value of the space domain obtained after a value in the (x,y) position subtracts 128, D(i,j) refers to a frequency coefficient value in the (i,j) position, and N represents a width and a length of a two-dimensional array. Variables within the cos function of the above equations relate to values of x, y, i, j and N. C(i) and C(j) functions in the above equations (1) and (2) may have different values as the variable i or j is 0 or otherwise. For example, if i is 0, C(i) is $1/\sqrt{2}$, and if j is 0, C(j) is $1/\sqrt{2}$. Conversely, if i is not 0, C(i) is 1, and if j is not 0, C(j) is 1.

When the electronic pen touches the screen, the host can analyse the captured image, the host can perform an inverse transform to the captured image through one of an inverse fast Fourier transform, an inverse discrete cosine transform and an inverse discrete wavelet transform.

It should be noticed that although several possible patterns of the coding method have been described in the above embodiments, several implementations of space domain variation are provided below for a further understanding of the spirit of the invention.

First embodiment of space domain variation-RGB values of each pixel are modified.

Figure 4:
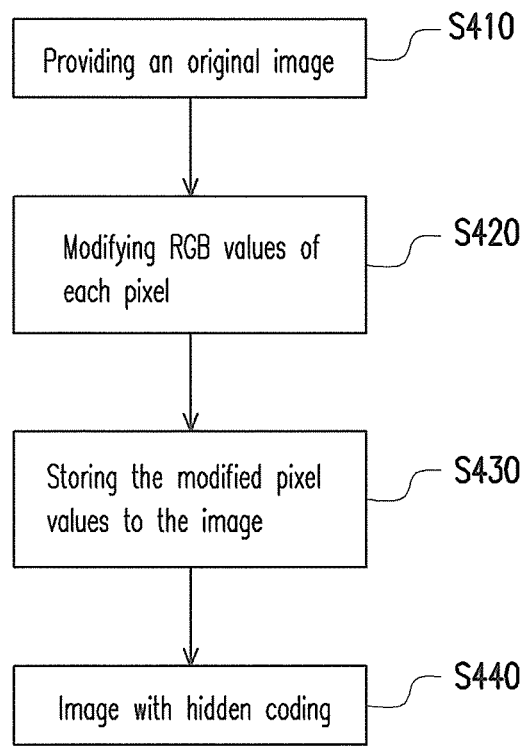
FIG. 4 is a flowchart illustrating an image coding flow in a space domain according to an embodiment of the invention.

Referring to FIG. 4, FIG. 4 is a flowchart illustrating an image coding flow in the space domain according to an embodiment of the invention. Steps of the image coding flow are as follows. First, in step S410, an original image is provided. Then, in step S420, RGB values of each pixel are modified. Then, in step S430, the modified pixel values are stored back to the image. Finally, in step S440, after the coding operation is completed, the image with hidden coding is generated.

Second embodiment of space domain variation-hidden coding operation is performed to two adjacent pixels.

Referring to FIG. 5, FIG. 5 is a schematic diagram illustrating RGB values of a certain pixel in a binary format. In FIG. 5, each sub-pixel R, G or B has 8 bits from the MSB to the LSB, and each sub-pixel value can be represented by a decimal value between 0 and 255. In such coding method, corresponding coordinate information is embedded in two adjacent pixels, and different coordinate information represent different hidden information.

In an embodiment, if a screen resolution is 1920×1080, two pixels are required to define the coordinate the cursor position, so that the coding method is performed in allusion to two adjacent pixels. Referring to FIG. 6, FIG. 6 is a schematic diagram illustrating coding of two adjacent pixels, wherein pixels Pixel 1 and Pixel 2 are two adjacent pixels. First, RGB values of each pixel are obtained. It is assumed that the last four bits of the RGB values are modified to add desired information, so that total 12 bits are available for coding, as that shown by a coding position encircled by dot lines. In each pixel, a fourth-last bit of a value of the sub-pixel R stores an x-coordinate information or a y-coordinate information of the current pixel, and the remained 11 bits $2^{11}$=2048 represent the coordinate position touched by the electronic pen. For example, the pixel Pixel 1=>000000000001 represents a position storing the x-coordinate $2^0$=1, and the pixel Pixel 2=>100000000011 represents a position storing the y-coordinate $2^1+2^0$=3, so that the hidden information of the two adjacent pixel represents a position of the two-dimensional coordinates (1,3).

Figures 7, 8:
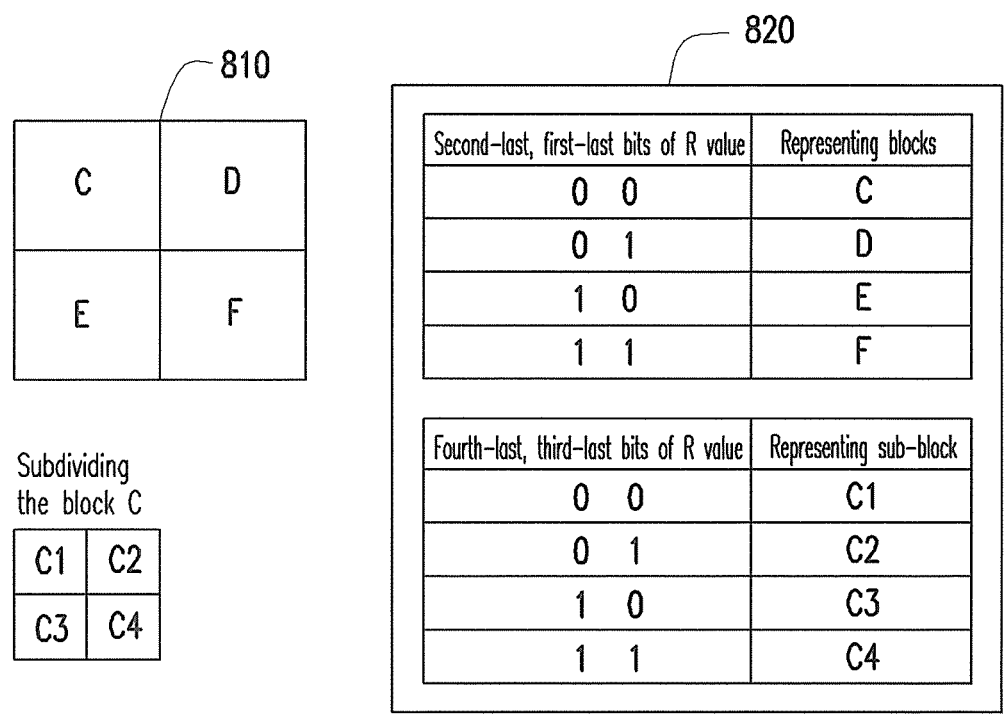
FIG. 7 is a schematic diagram illustrating coding of a screen image in a space domain according to an embodiment of the invention.
FIG. 8 is a schematic diagram illustrating coding and decoding operations through a look-up table in a space domain according to an embodiment of the invention.

Referring to FIG. 7, FIG. 7 is a schematic diagram illustrating coding of a screen image in the space domain according to an embodiment of the invention. The screen image has pixels Pixel 1, Pixel 2, Pixel 3, Pixel 4, . . . , Pixel N−1, Pixel N, Pixel N+1, Pixel N+2, . . . , Pixel M. When two adjacent pixels are coded, one pixel stores information X, and another adjacent pixel stores information Y. When a part of the screen image captured by the electronic pen is the blocks of the pixels Pixel 1 and Pixel 2 of FIG. 6, the host analyses and decodes the adjacent pixels Pixel 1 and Pixel 2 in the captured image, and obtains the position where the electronic pen touches to be the two-dimensional coordinates (1,3) in the image.

Third embodiment of space domain variation-hidden coding operation is performed according a look-up table.

Referring to FIG. 8, FIG. 8 is a schematic diagram illustrating coding and decoding operations through a look-up table in the space domain according to an embodiment of the invention. The image to be displayed can be divided into a plurality of blocks, for example, an image 810 is divided into four blocks C, D, E and F. The block C can be further divided into four sub-blocks C1, C2, C3 and C4. Similarly, the blocks D, E and F can also be divided into a plurality of sub-blocks as that does of the block C. The coding method is, for example, to store information of the block C, D, E or F in the second-last and the first-last bits of the value of the sub-pixel R of each pixel, and store information of the sub-block C1, C2, C3 or C4 in the fourth-last and the third-last bits of the value of the sub-pixel R of each pixel. The above coding method and the corresponding blocks can be implemented according to a look-up table 820. The look-up table 820 recodes a plurality blocks and the corresponding block information, which can be further expended to store more blocks, wherein different block information respectively represents different hidden information. For example, 00, 01, 10, 11 of the second-last and the first bits of the value of the sub-pixel R respectively represent the blocks C, D, E and F, and 00, 01, 10, 11 of the fourth-last and the third bits of the value of the sub-pixel R respectively represent the blocks C1, C2, C3 and C4. It is relatively easy to code and decode each pixel by using the look-up table. When the image is relatively large, more blocks can be subdivided, i.e. a recursive method is used to finely define a position, so that the position touched by the electronic pen can be accurately identified.

Although several possible patterns of hidden coding and decoding have been described in the above embodiments, those skilled in the art should understand that coding designs of different manufactures are different, so that the invention is not limited to the above several possible patterns. In other words, as long as human eyes cannot perceive the hidden information in the image when the coded image is displayed on the screen, it is considered to be within the scope of the invention. Several implementations are further provided below for a further understanding of the spirit of the invention.

Figure 9:
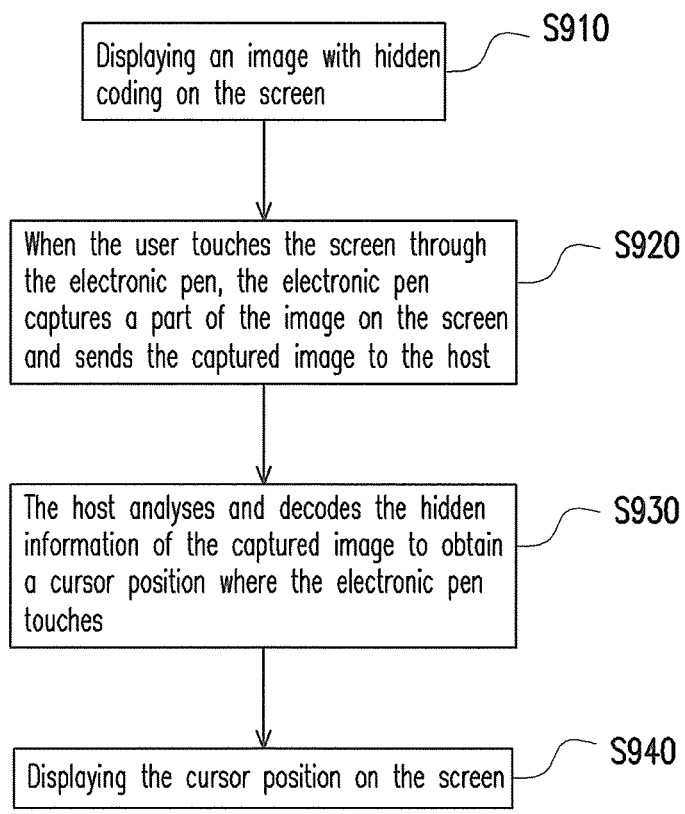
FIG. 9 is a flowchart illustrating a touch-controlled method according to an embodiment of the invention.

Referring to FIG. 9, FIG. 9 is a flowchart illustrating a touch-controlled method according to an embodiment of the invention. The touch-controlled method is suitable for the touch-controlled system of FIG. 1 for identifying a position touched by a user. The touch-controlled method includes following steps. In step S910, an image with hidden coding is displayed on the screen. Then, in step S920, when the user touches the screen through the electronic pen, the electronic pen captures a part of the image on the screen, and sends the captured image to the host, wherein at least one hidden information is hidden in the image captured by the electronic pen, and human eyes cannot perceive the hidden information. In step S930, the host analyses and decodes the hidden information of the captured image to obtain a cursor position where the electronic pen touches. Finally, in step S940, the cursor position is displayed on the screen. It should be noticed that in the present embodiment, the coding and decoding method can be as that described in the aforementioned embodiments.

According to the above descriptions, the touch-controlled system and the method thereof may improve a level of the touch-controlled technique, and improve a capability for positioning the touch position, so that the position touched by the user can be accurately identified. Moreover, special sensing devices are unnecessary to be added to the panel, and images with hidden information can be displayed on any screen, which is not limited by a type of the screen.

In summary, in the invention, an electronic pen equipped with an optical sensor is used to receive the hidden information on the screen, and the hidden information is transmitted to the host through RF, USB or blue-tooth for analysing and decoding, so as to display the cursor position on the screen.

The touch technique of the invention may improve accuracy of identifying a touch position, so as to mitigate a problem of inaccurate touch position of the conventional touch technique, and implement a touch-controlled effect on any screen to achieve an interactive effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A touch-controlled system, comprising:
a screen, arranged for displaying an image with hidden coding;
a host, coupled to the screen, arranged for driving the screen to display the image; and
an electric pen, wherein when the electronic pen touches the screen, the electronic pen captures a part of the image on the screen and sends the captured image to the host, wherein at least one hidden information is hidden in the image captured by the electronic pen, the host is arranged for analysing and decoding the hidden information of the captured image to obtain a cursor position where the electronic pen touches, so as to display the cursor position on the screen,
wherein before the host drives the screen, a least significant bit (LSB) of each pixel of the image to be displayed is hidden into the hidden information; and the host analyses the LSB of each pixel of the captured image to obtain the hidden information, and performs decoding to obtain coordinates of the cursor position.

2. The touch-controlled system as claimed in claim 1, wherein the electronic pen transmits the hidden information through radio frequency, universal serial bus, or blue-tooth.

3. The touch-controlled system as claimed in claim 1, wherein before the host drives the screen, a coding pattern or a digital watermark is embedded to the image to be displayed; and the host analyses the coding pattern or the digital watermark of the captured image, and performs decoding according to the coding pattern or the digital watermark, so as to obtain coordinates of the cursor position.

4. The touch-controlled system as claimed in claim 1, wherein before the host drives the screen, a mathematical function is used to transform the image to be displayed through one of an fast Fourier transform, a discrete cosine transform and a discrete wavelet transform; and when the host analyses the captured image, the host performs an inverse transform to the captured image through one of an inverse fast Fourier transform, an inverse discrete cosine transform and an inverse discrete wavelet transform.

5. The touch-controlled system as claimed in claim 1, wherein before the host drives the screen, two adjacent pixels in the image to be displayed are hidden in corresponding coordinate information, and different coordinate information respectively represents different hidden information; and the host analyses and decodes the two adjacent pixels of the captured image to obtain coordinates of the cursor position.

6. The touch-controlled system as claimed in claim 1, wherein before the host drives the screen, the image to be displayed is divided into a plurality of blocks, and images of the blocks are respectively hidden into corresponding block information according to a look-up table, and different block information represent different hidden information; and when the host analyses the captured image, the host analyses and decodes the hidden information according to the look-up table, so as to obtain coordinates of the cursor position.

7. A touch-controlled method, adapted to a touch-controlled system for identifying a touch position of a user, wherein the touch-controlled system comprises a screen, a host and an electronic pen, the host is used to drive the screen for displaying images, and the touch-controlled method comprising:
displaying an image with hidden coding on the screen;
capturing a part of the image on the screen by the electronic pen and sending the captured image to the host when the user touches the screen through the electronic pen, wherein before the host drives the screen, two adjacent pixels in the image to be displayed are hidden in corresponding coordinate information, and different coordinate information respectively represents different hidden information, wherein at least one hidden information is hidden in the image captured by the electronic pen;
analysing and decoding the hidden information of the captured image by the host to obtain a cursor position where the electronic pen touches, comprising
analysing and decoding two adjacent pixels of the captured image by the host to obtain coordinates of the cursor position; and
displaying the cursor position on the screen.

8. The touch-controlled method as claimed in claim 7, wherein the electronic pen transmits the hidden information through radio frequency, universal serial bus, or blue-tooth.

9. The touch-controlled method as claimed in claim 7, wherein before the host drives the screen, a coding pattern or a digital watermark is embedded to the image to be displayed; and the step of analysing and decoding the hidden information of the captured image by the host comprises:
analysing and decoding the coding pattern or the digital watermark of the captured image by the host, so as to obtain coordinates of the cursor position.

10. The touch-controlled method as claimed in claim 7, wherein before the host drives the screen, a least significant bit (LSB) of each pixel of the image to be displayed is hidden into the hidden information; and the step of analysing and decoding the hidden information of the captured image by the host comprises:
analysing the least significant bit of each pixel of the captured image by the host to obtain the hidden information, and performing decoding to obtain coordinates of the cursor position.

11. The touch-controlled method as claimed in claim 7, wherein before the host drives the screen, a mathematical function is used to transform the image to be displayed through one of an fast Fourier transform, a discrete cosine transform and a discrete wavelet transform; and when the host analyses the captured image; and the step of analysing and decoding the hidden information of the captured image by the host comprises:
performing an inverse transform to the captured image by the host through one of an inverse fast Fourier transform, an inverse discrete cosine transform and an inverse discrete wavelet transform when the host analyses the captured image.

12. The touch-controlled method as claimed in claim 7, wherein before the host drives the screen, the image to be displayed is divided into a plurality of blocks, and images of the blocks are respectively hidden into corresponding block information according to a look-up table, and different block information represents different hidden information; and the step of analysing and decoding the hidden information of the captured image by the host comprises:
analysing and decoding the hidden information by the host according to the look-up table when the host analyses the captured image, so as to obtain coordinates of the cursor position.

13. A touch-controlled system, comprising:
a screen, arranged for displaying an image with hidden coding;
a host, coupled to the screen, arranged for driving the screen to display the image; and
an electric pen, wherein when the electronic pen touches the screen, the electronic pen captures a part of the image on the screen and sends the captured image to the host,
wherein at least one hidden information is hidden in the image captured by the electronic pen, the host is arranged for analysing and decoding the hidden information of the captured image to obtain a cursor position where the electronic pen touches, so as to display the cursor position on the screen,
wherein before the host drives the screen, a mathematical function is used to transform the image to be displayed through one of an fast Fourier transform, a discrete cosine transform and a discrete wavelet transform; and when the host analyses the captured image, the host performs an inverse transform to the captured image through one of an inverse fast Fourier transform, an inverse discrete cosine transform and an inverse discrete wavelet transform.

14. The touch-controlled system as claimed in claim 13, wherein before the host drives the screen, a coding pattern or a digital watermark is embedded to the image to be displayed; and the host analyses the coding pattern or the digital watermark of the captured image, and performs decoding according to the coding pattern or the digital watermark, so as to obtain coordinates of the cursor position.

15. The touch-controlled system as claimed in claim 13, wherein before the host drives the screen, a least significant bit (LSB) of each pixel of the image to be displayed is hidden into the hidden information; and the host analyses the LSB of each pixel of the captured image to obtain the hidden information, and performs decoding to obtain coordinates of the cursor position.

16. The touch-controlled system as claimed in claim 13, wherein before the host drives the screen, two adjacent pixels in the image to be displayed are hidden in corresponding coordinate information, and different coordinate information respectively represents different hidden information; and the host analyses and decodes the two adjacent pixels of the captured image to obtain coordinates of the cursor position.

17. The touch-controlled system as claimed in claim 13, wherein before the host drives the screen, the image to be displayed is divided into a plurality of blocks, and images of the blocks are respectively hidden into corresponding block information according to a look-up table, and different block information represent different hidden information; and when the host analyses the captured image, the host analyses and decodes the hidden information according to the look-up table, so as to obtain coordinates of the cursor position.

18. A touch-controlled method, adapted to a touch-controlled system for identifying a touch position of a user, wherein the touch-controlled system comprises a screen, a host and an electronic pen, the host is used to drive the screen for displaying images, and the touch-controlled method comprising:
displaying an image with hidden coding on the screen;

capturing a part of the image on the screen by the electronic pen and sending the captured image to the host when the user touches the screen through the electronic pen, wherein before the host drives the screen, the image to be displayed is divided into a plurality of blocks, and images of the blocks are respectively hidden into corresponding block information according to a look-up table, and different block information represents different hidden information, wherein at least one hidden information is hidden in the image captured by the electronic pen;

analysing and decoding the hidden information of the captured image by the host to obtain a cursor position where the electronic pen touches, comprising:
analysing and decoding the hidden information by the host according to the look-up table when the host analyses the captured image, so as to obtain coordinates of the cursor position; and displaying the cursor position on the screen.

19. The touch-controlled method as claimed in claim 18, wherein before the host drives the screen, a coding pattern or a digital watermark is embedded to the image to be displayed; and the step of analysing and decoding the hidden information of the captured image by the host comprises:
analysing and decoding the coding pattern or the digital watermark of the captured image by the host, so as to obtain coordinates of the cursor position.

20. The touch-controlled method as claimed in claim 18, wherein before the host drives the screen, a least significant bit (LSB) of each pixel of the image to be displayed is hidden into the hidden information; and the step of analysing and decoding the hidden information of the captured image by the host comprises:
analysing the least significant bit of each pixel of the captured image by the host to obtain the hidden information, and performing decoding to obtain coordinates of the cursor position.

21. The touch-controlled method as claimed in claim 18, wherein before the host drives the screen, a mathematical function is used to transform the image to be displayed through one of an fast Fourier transform, a discrete cosine transform and a discrete wavelet transform; and when the host analyses the captured image; and the step of analysing and decoding the hidden information of the captured image by the host comprises:
performing an inverse transform to the captured image by the host through one of an inverse fast Fourier transform, an inverse discrete cosine transform and an inverse discrete wavelet transform when the host analyses the captured image.

22. The touch-controlled method as claimed in claim 18, wherein before the host drives the screen, two adjacent pixels in the image to be displayed are hidden in corresponding coordinate information, and different coordinate information respectively represents different hidden information; and the step of analysing and decoding the hidden information of the captured image by the host comprises:
analysing and decoding two adjacent pixels of the captured image by the host to obtain coordinates of the cursor position.

* * * * *